United States Patent [19]
Hayashi et al.

[11] Patent Number: 5,805,313
[45] Date of Patent: Sep. 8, 1998

[54] COLOR CORRECTING METHOD AND COLOR CORRECTING DEVICE INVOLVING MASKING EQUATION VARIATION BASED UPON GRAY LEVELS FOR A SELECTED COLOR

[75] Inventors: Shuji Hayashi; Haruo Yamamoto; Koichi Matsuo; Shinji Hayashi, all of Osaka, Japan

[73] Assignee: Mita Industrial Co., Ltd., Japan

[21] Appl. No.: 124,701

[22] Filed: Sep. 22, 1993

[30] Foreign Application Priority Data

Sep. 28, 1992 [JP] Japan ..................................... 4-257897

[51] Int. Cl.⁶ ................................. G03F 3/08; H04N 1/46
[52] U.S. Cl. ........................... 358/518; 358/515; 358/517
[58] Field of Search .................................. 358/518, 521, 358/517, 515, 500, 501, 512, 455, 456, 458, 447, 448

[56] References Cited

U.S. PATENT DOCUMENTS

| | | | |
|---|---|---|---|
| 4,510,530 | 4/1985 | Miura et al. | 358/314 |
| 4,636,844 | 1/1987 | Sasaki | 358/517 |
| 4,745,466 | 5/1988 | Yoshida et al. | 358/515 |
| 4,809,082 | 2/1989 | Yamaguchi et al. | 358/283 |
| 4,853,768 | 8/1989 | Suzuki et al. | 358/518 |
| 4,906,942 | 3/1990 | Nakai et al. | 329/318 |
| 4,954,889 | 9/1990 | Endo et al. | 358/517 |
| 4,975,769 | 12/1990 | Aizu et al. | 358/517 |
| 5,220,416 | 6/1993 | Hasebe et al. | 358/518 |
| 5,398,109 | 3/1995 | Amakawa et al. | 358/523 |
| 5,422,740 | 6/1995 | Fujimoto et al. | 358/456 |

Primary Examiner—Thomas D. Lee
Attorney, Agent, or Firm—Beveridge, DeGrandi, Weilacher & Young, L.L.P.

[57] ABSTRACT

Input data corresponding to three primary colors C, M and Y are subjected to masking correction, to obtain data C', M' and Y'. A correction factor in a masking equation is varied depending on which of three sections into which all the gray levels of each of the input data C, M and Y are divided, the section being a section to which the input data of a selected color belong. As a result, suitable masking correction conforming to the value of the input data is made, thereby to improve color reproducibility of a color image.

8 Claims, 16 Drawing Sheets

F I G. 2
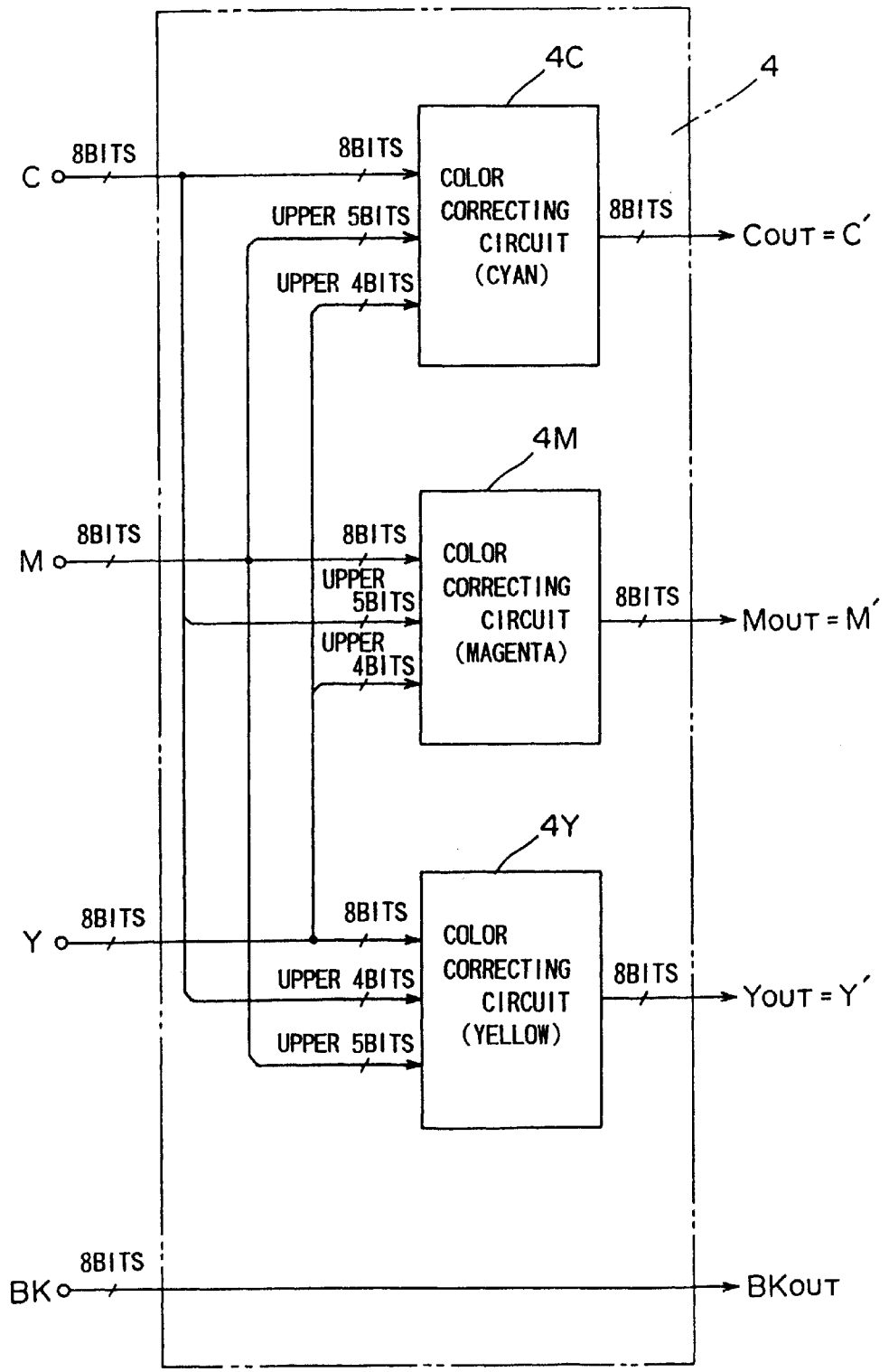

F I G. 5
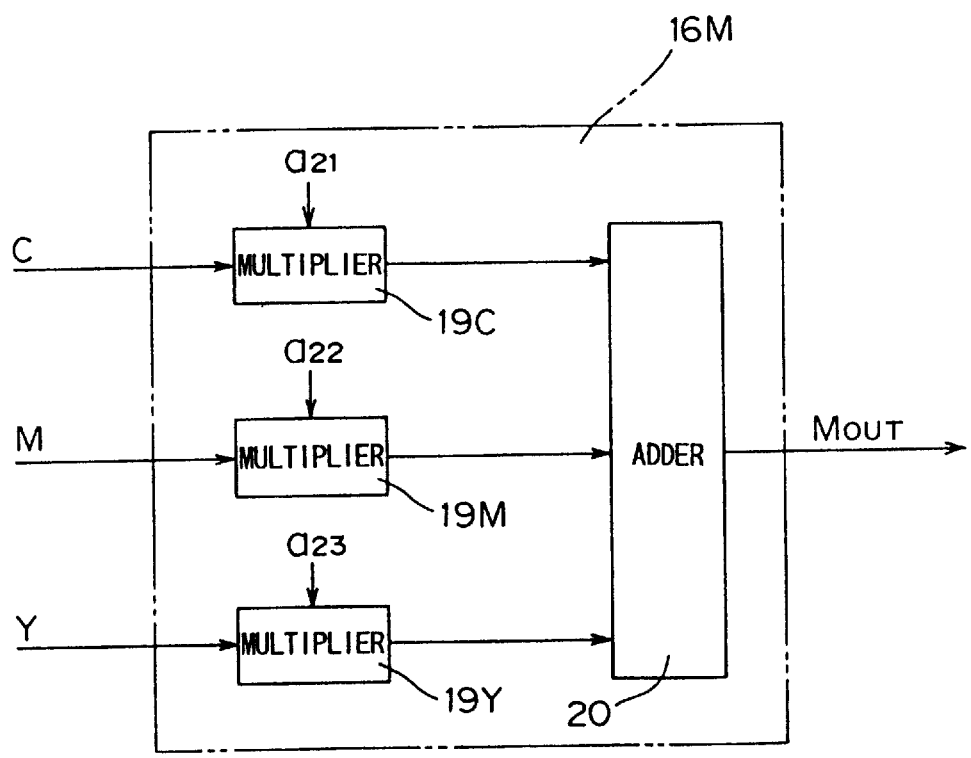

F I G. 6
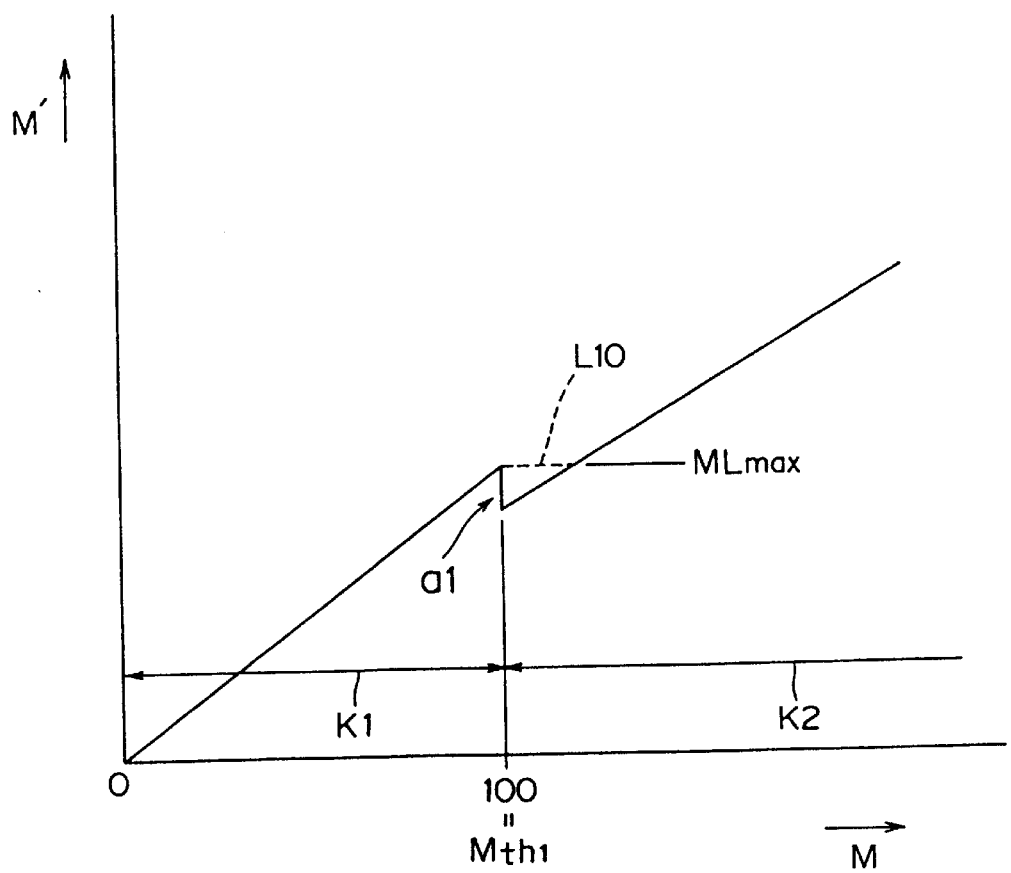

F I G. 9
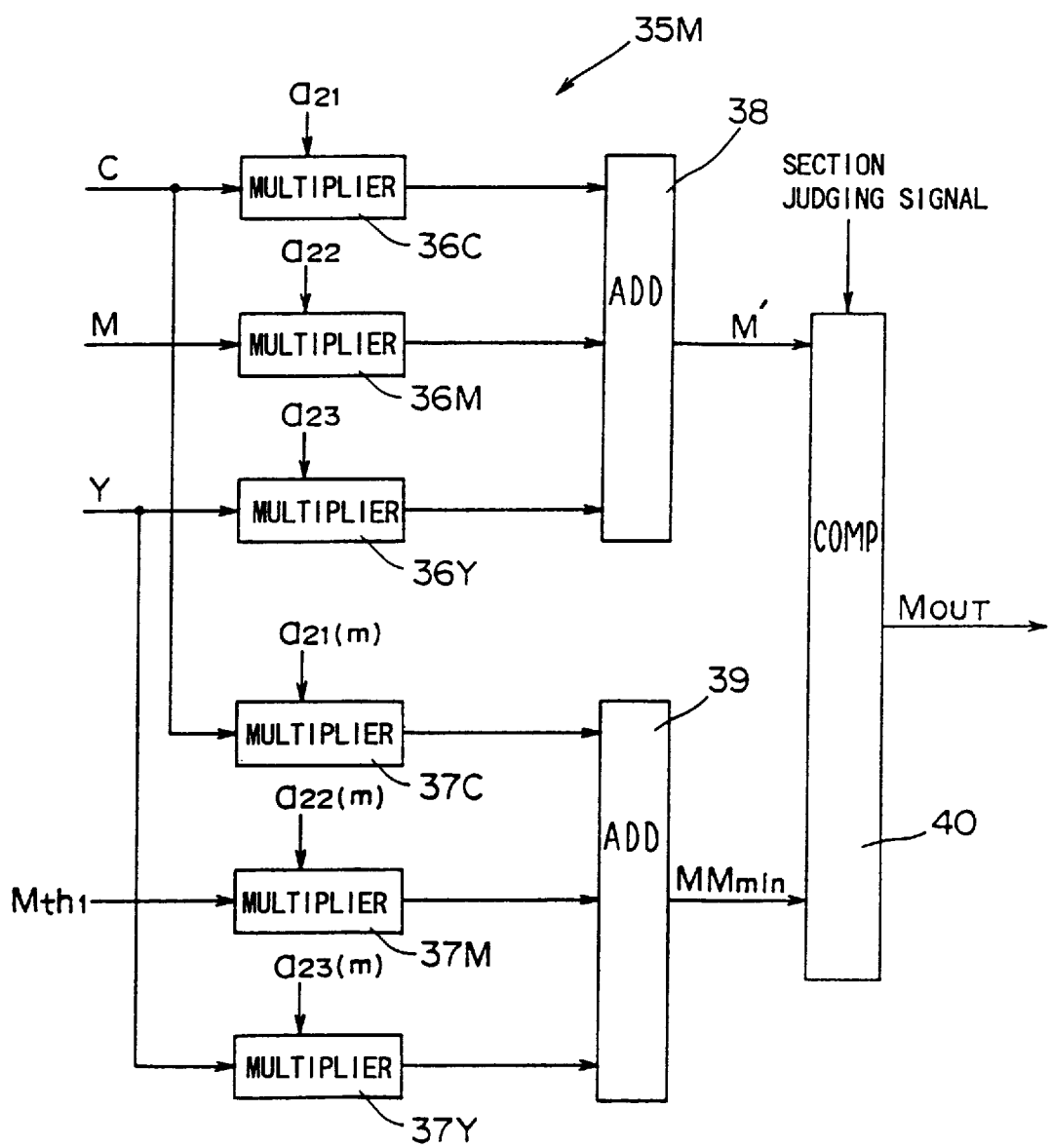

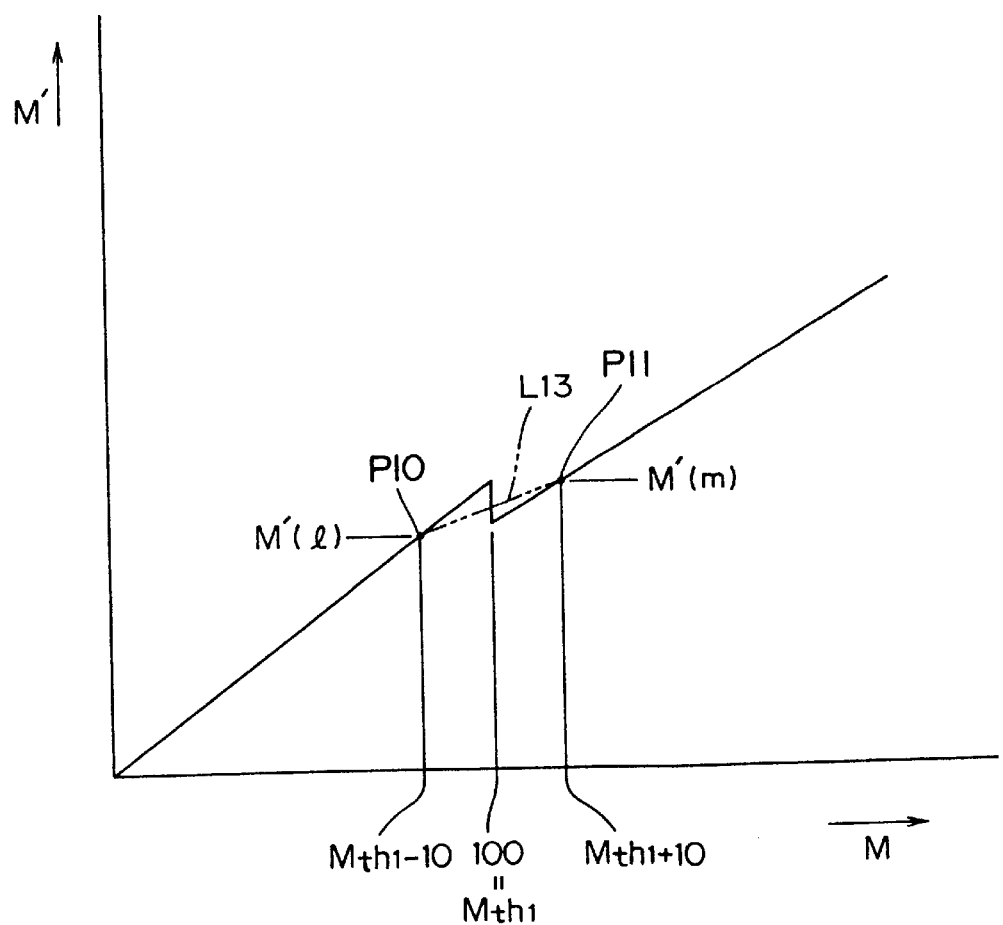
F I G. 13

COLOR CORRECTING METHOD AND COLOR CORRECTING DEVICE INVOLVING MASKING EQUATION VARIATION BASED UPON GRAY LEVELS FOR A SELECTED COLOR

BACKGROUND OF THE INVENTION

1. Field of the Invention

The present invention relates to a color correcting method and a color correcting device which are applied so as to improve color reproducibility in an apparatus for forming a color image such as a color copying machine. More specifically, the present invention relates to a color correcting method and a color correcting device for making color correction using so-called masking correction.

2. Description of the Related Art

A color copying machine so adapted as to optically read a color document by a CCD (Charge Coupled Device) scanner to convert the color document into signals representing the three primary colors (additive), red (R), green (G) and blue (B) and form a color image on the basis of the signals has been conventionally used. The signals representing the three primary colors R, G and B which are outputted from the scanner are converted into data corresponding to the three primary colors (subtractive), cyan, magenta and yellow C, M and Y which are the additive complementary colors of red, green and blue. Each of the data corresponding to the three primary colors C, M and Y is 8-bit data represented at 256 gray levels. The data corresponding to the three primary colors C, M and Y are subjected to suitable correction, and data corresponding to black BK is further generated on the basis of the data after the correction.

For example, the surface of a photoreceptor is scanned by a laser beam which is subjected to modulation based on the data C, to form an electrostatic latent image corresponding to cyan on the surface of the photoreceptor. The electrostatic latent image is developed into a toner image using cyan toner particles, and this toner image is transferred to copy paper. In the same manner, toner images in respective colors, that is, magenta, yellow and black are transferred to the copy paper one over the other to correspond to the data M, the data Y and the data BK. Finally, the toner particles are fixed to the copy paper, to achieve a color copy.

Since the original document and the copy image formed on the copy paper can be easily compared with each other, a demand for reproducibility of colors on the color copying machine is rigid. However, toner particles in respective colors, that is, cyan, magenta and yellow used for forming the color image are not respectively pure cyan, magenta and yellow but are slightly muddy. Even if the data C, M, Y and BK are simply generated from an output of the CCD scanner, therefore, the colors cannot be sufficiently reproduced.

FIG. 16 is a diagram for explaining muddiness, which shows characteristics of reflectance in a case where an image in magenta which is the additive complementary color of green is formed on copy paper. If the magenta image formed on the copy paper exhibits ideal characteristics of reflectance, neither light in a blue wavelength region $\lambda_B$ nor light in a red wavelength region $\lambda_R$ is absorbed, while light in a green wavelength region $\lambda_G$ is completely absorbed, as indicated by a curve L1 in FIG. 16. However, the characteristics of reflectance of the magenta image actually formed on the copy paper is as indicated by a curve L2. Specifically, in the actual magenta toner particles, light is undesirably absorbed in the blue wavelength region $\lambda_B$ and the red wavelength region $\lambda_R$, as indicated by hatching in FIG. 16.

A technique for correcting such undesirable light absorption is masking correction. The masking correction is disclosed in, for example, Japanese Patent Laid-Open Gazette No. 7855/1989. Specifically, data corresponding to cyan, magenta and yellow (C, M, Y) obtained from an output of a scanner are subjected to a matrix operation conforming to a masking equation given by the following expression (A), thereby to obtain corrected data (C', M' Y').

$$\begin{pmatrix} C' \\ M' \\ Y' \end{pmatrix} = \begin{pmatrix} a_{11} & a_{12} & a_{13} \\ a_{21} & a_{22} & a_{23} \\ a_{31} & a_{32} & a_{33} \end{pmatrix} = \begin{pmatrix} C \\ M \\ Y \end{pmatrix} \quad (A)$$

For example, in order to correct undesirable light absorption indicated by hatching in FIG. 16, light reflectance in the blue and red wavelength regions $\lambda_B$ and $\lambda_R$ may be compensated for. Since a blue component and a red component are compensated for by cyan and yellow toner particles, masking correction can be made by correcting the data corresponding to cyan and yellow C and Y.

A correction factor $a_{ij}$ (where i=1, 2, 3, and j=1, 2, 3) in the masking equation given by the foregoing expression (A) is theoretically or experimentally set depending on, for example, the characteristics of toner particles used and the characteristics of a color filter used for a scanner.

The respective gray levels of the three primary colors are expressed by the pixel density. The density of a toner image varies depending on the change in the pixel density. Specifically, if data corresponding to magenta M is increased, the magenta pixel density is increased, so that the density of magenta is increased.

FIG. 17 shows the wavelength characteristics of reflectance of the magenta images in a simplified manner when uniform magenta images are respectively formed with respect to the pixel densities 100%, 80% and 50%. Specifically, curves L (100), L (80) and L (50) respectively correspond to the wavelength characteristics of reflectance in a case where the pixel densities are set to 100%, 80% and 50%. As can be seen from FIG. 17, the density of magenta is increased as the data corresponding to magenta M is increased to increase the pixel density.

In this case, however, the change in reflectance with the change in pixel density does not equally appear in the blue wavelength region $\lambda_B$ and the red wavelength region $\lambda_R$. For example, the change in reflectance in the blue wavelength region $\lambda_B$ is smaller than the change in reflectance in the red wavelength region $\lambda_R$. If the masking equation using a constant correction factor $a_{ij}$ is equally applied to all the gray levels of each of the colors, a good masking correction is achieved in a certain range of the gray levels, while a good masking correction is not made in the other ranges of the gray levels. This involves the likelihood that colors cannot be sufficiently reproduced.

SUMMARY OF THE INVENTION

An object of the present invention is to solve the above described technical subject and to provide a color correcting method in which colors in a color image can be sufficiently reproduced.

Another object of the present invention is to provide a color correcting device capable of sufficiently reproducing colors in a color image.

In the present invention, input data C, input data M and input data Y corresponding to three primary colors each represented at gray levels are subjected to correction conforming to a masking equation given by the following expression (A), to generate corrected data C', corrected data M' and corrected data Y' corresponding to the three primary colors. In the case of this correction, all the gray levels of at least one particular color selected from the three primary colors are divided into at least two sections. A correction factor $a_{ij}$ (where i=1, 2, 3, and j=1, 2, 3) in the masking equation given by the following expression (A) is varied depending on which of the sections is a section to which the value of the input data corresponding to the above described particular color belongs.

Consequently, suitable masking correction can be made depending on the value of the input data, thereby to improve color reproducibility.

$$\begin{pmatrix} C' \\ M' \\ Y' \end{pmatrix} = \begin{pmatrix} a_{11} & a_{12} & a_{13} \\ a_{21} & a_{22} & a_{23} \\ a_{31} & a_{32} & a_{33} \end{pmatrix} = \begin{pmatrix} C \\ M \\ Y \end{pmatrix} \quad (A)$$

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram showing the structure of a color correcting section;

FIG. 5 is a block diagram showing the structure of a part of the above described second embodiment;

FIG. 6 is a diagram for explaining color correction processing in a third embodiment of the present invention;

FIG. 9 is a block diagram showing the structure for realizing the color correction processing in the above described fourth embodiment;

FIG. 13 is a diagram for explaining color correction processing in a sixth embodiment of the present invention;

DESCRIPTION OF THE PREFERRED EMBODIMENTS

Figure 1:
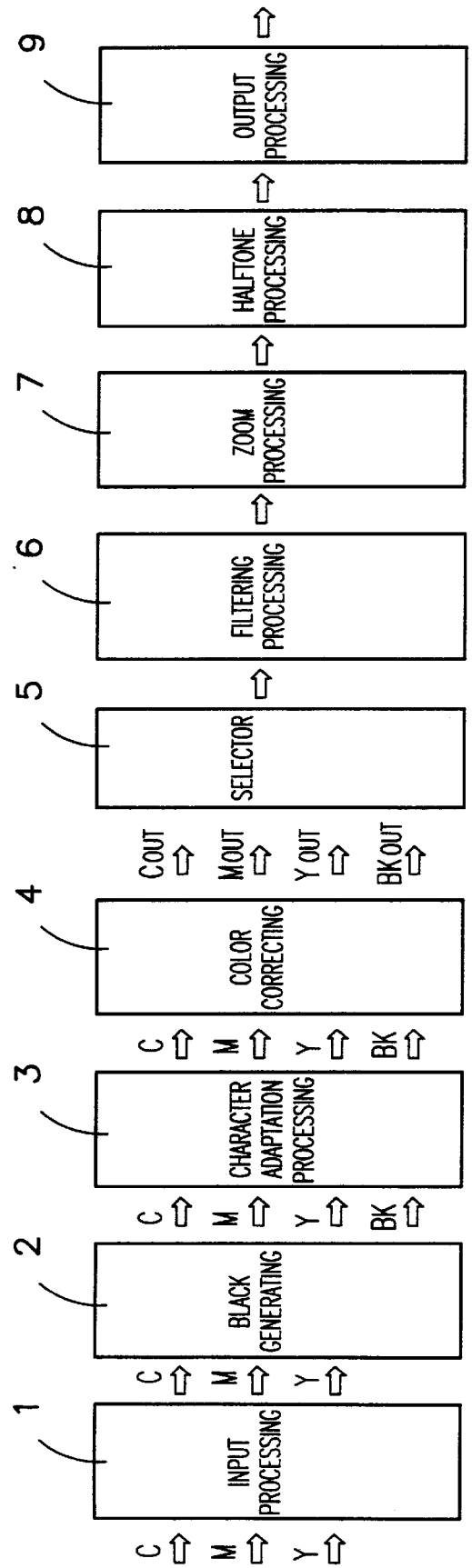
FIG. 1 is a block diagram showing the electrical construction of a color copying machine to which one embodiment of the present invention is applied.

FIG. 1 is a block diagram showing the electrical construction of a color copying machine to which one embodiment of the present invention is applied. A color copying machine comprises a scanner section including a CCD (Charge Coupled Device) scanner for reading a document. In this scanner section, data corresponding to cyan, magenta and yellow C, M and Y are generated. Each of the data C, M and Y is, for example, 8-bit data which is represented at 256 gray levels.

This data is applied to a black generating section 2 through an input processing section 1. In this black generating section 2, the data C, M and Y are subjected to predetermined correction, and data corresponding to black BK is further generated.

The data C, M, Y and BK from the black generating section 2 are inputted to a character adaptation processing section 3. In this character adaptation processing section 3, a character region is extracted on the basis of the characteristics of the input data, and the extracted character region is subjected to processing for emphasizing a contour.

The data C, M, Y and BK after the character adaptation processing are inputted to a color correcting section 4. In the color correcting section 4, the data C, M, Y and BK are subjected to masking correction as described later. Data after the correction $C_{OUT}$, $M_{OUT}$, $Y_{OUT}$ and $BK_{OUT}$ are inputted to a selector 5. In the selector 5, the data $C_{OUT}$, $M_{OUT}$, $Y_{OUT}$ and $BK_{OUT}$ are sequentially selected. The selected data is inputted to a filtering processing section 6. In the filtering processing section 6, processing for, for example, facilitating the separation of a binary image region and a halftone image region is performed.

The data after the filtering processing is applied to a zoom processing section 7. In the zoom processing section 7, the data is subjected to processing for enlarging or reducing an image. The data after the processing is inputted to a halftone processing section 8. In the halftone processing section 8, the data is subjected to halftone processing using a dither matrix. The data after the processing is applied to an output processing section 9. In the output processing section 9, a video signal corresponding to the input data, for example, is generated. This video signal is applied to, for example, a laser scanning unit which is outside FIG. 1.

The laser scanning unit selectively exposes the surface of a photoreceptor, to form an electrostatic latent image. This electrostatic latent image is developed by, for example, cyan toner particles, and a cyan toner image is transferred to copy paper. In the same manner, the laser scanning unit sequentially forms electrostatic latent images corresponding to magenta, yellow and black on the surface of the photoreceptor, and the electrostatic latent images are respectively developed by magenta, yellow and black toner particles. Toner images in the respective colors are transferred to the copy paper one over the other, and the toner particles are finally fixed to the copy paper, thereby to achieve a color copy.

FIG. 2 is a block diagram showing the internal structure of the color correcting section 4. The color correcting section 4 subjects the inputted data corresponding to the three primary colors C, M and Y to masking correction in accordance with a masking equation given by the following expression (A), thereby to generate corrected data C', M' and Y':

$$\begin{pmatrix} C' \\ M' \\ Y' \end{pmatrix} = \begin{pmatrix} a_{11} & a_{12} & a_{13} \\ a_{21} & a_{22} & a_{23} \\ a_{31} & a_{32} & a_{33} \end{pmatrix} = \begin{pmatrix} C \\ M \\ Y \end{pmatrix} \quad (A)$$

Therefore, the color correcting section 4 comprises three color correcting circuits 4C, 4M, and 4Y. They respectively function as operating means. The color correcting circuit 4C outputs corrected data C' corresponding to cyan, the color correcting circuit 4M outputs corrected data M' corresponding to magenta, and the color correcting circuit 4Y outputs corrected data Y' corresponding to yellow. The corrected data C', M' and Y' respectively become output data $C_{OUT}$, $M_{OUT}$ and $Y_{OUT}$. In addition, the data BK itself shall be output data $BK_{OUT}$.

The color correcting circuits 4C, 4M and 4Y are respectively constituted by ROMs (Read-Only Memories). For example, 8-bit data corresponding to magenta M is directly inputted to the color correcting circuit 4M corresponding to magenta. In addition, upper five bits of the 8-bit data corresponding to cyan C and upper four bits of the 8-bit data corresponding to yellow Y are inputted to the color correcting circuit 4M. Data of 17 bits in total is inputted in parallel as an address to the color correcting circuit 4M, and a value stored in this 17-bit address is outputted as the corrected data M'.

Specifically, in the color correcting circuit 4M, corrected data is prepared for one gray level with respect to magenta, corrected data is prepared for eight ($=2^{8-5}=2^3$) gray levels with respect to cyan, and corrected data is prepared for 16 ($=2^4$) gray levels with respect to yellow.

The same is true for the other color correcting circuits 4C and 4Y.

The corrected data C', M' and Y' which are the results obtained by executing an operation conforming to the masking equation given by the foregoing expression (A) are respectively stored in the ROMs constituting the color correcting circuits 4C, 4M and 4Y. In operating the corrected data C', M' and Y', values which differ with respect to the respective values of the data C, M and Y are applied to a correction factor $a_{ij}$ in the masking equation, as shown in the following table 1.

TABLE 1

|  | range of gray levels | $a_{i1}$ | $a_{i2}$ | $a_{i3}$ |
|---|---|---|---|---|
| C | 0–100 | 0.95 | −0.10 | −0.10 |
| ($a_{1j}$) | 101–200 | 0.97 | −0.10 | −0.10 |
|  | 201–255 | 1.00 | −0.16 | −0.09 |
| M | 0–100 | −0.08 | 1.04 | 0.00 |
| ($a_{2j}$) | 101–200 | −0.17 | 0.89 | −0.05 |
|  | 201–255 | −0.18 | 1.07 | −0.10 |
| Y | 0–100 | 0.00 | 0.00 | 0.68 |
| ($a_{3j}$) | 101–200 | −0.07 | −0.07 | 0.70 |
|  | 201–255 | 0.10 | 0.20 | 0.68 |

Specifically, all the gray levels of each of the data C, M and Y represented at 256 gray levels are divided into three sections at "100" and "200" utilized as boundary values. Correction factors $a_{11}$, $a_{12}$, and $a_{13}$ are selected depending on which of the sections is a section to which the value of the input data C belongs. In addition, correction factors $a_{21}$, $a_{22}$ and $a_{23}$ are selected depending on which of the sections is a section to which the value of the input data M belongs. Similarly, correction factors $a_{31}$, $a_{32}$ and $a_{33}$ are selected depending on which of the sections is a section to which the value of the input data Y belongs.

The above described correction factor $a_{ij}$ set for each section is a value previously so found that colors are sufficiently reproduced on the basis of a theoretical value and the result of experiment. More specifically, the value $a_{ij}$ is determined on the basis of the toner characteristics of the three primary colors.

For example, if input data are (C, M, Y)=(250, 10, 120), the masking equation is as given by the following expression (1):

$$\begin{pmatrix} C' \\ M' \\ Y' \end{pmatrix} = \begin{pmatrix} 1.00 & -0.16 & -0.09 \\ -0.08 & 1.04 & 0.00 \\ -0.07 & -0.07 & 0.70 \end{pmatrix} = \begin{pmatrix} C \\ M \\ Y \end{pmatrix} \quad (1)$$

According to the above described table 1, 27 ($=3^3$) masking equations as given by the expression (1) are obtained.

Figure 3A:
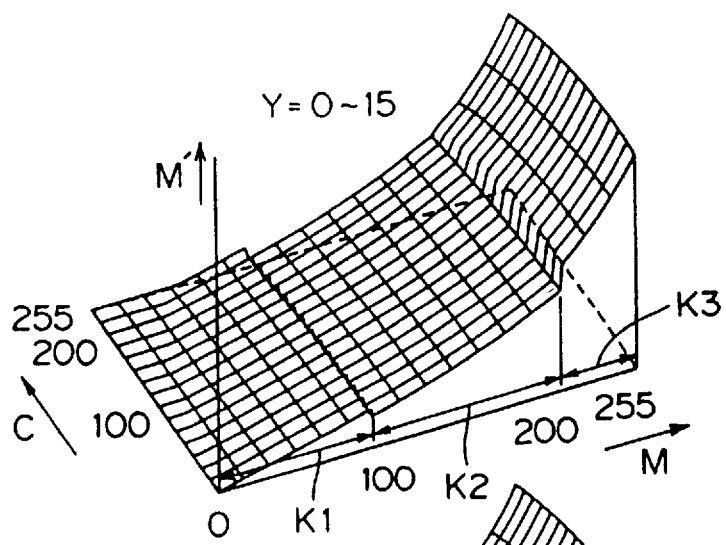
FIGS. 3 (a), 3 (b) and 3 (c) are diagrams for explaining processing in the color correcting section.
Figure 3B:
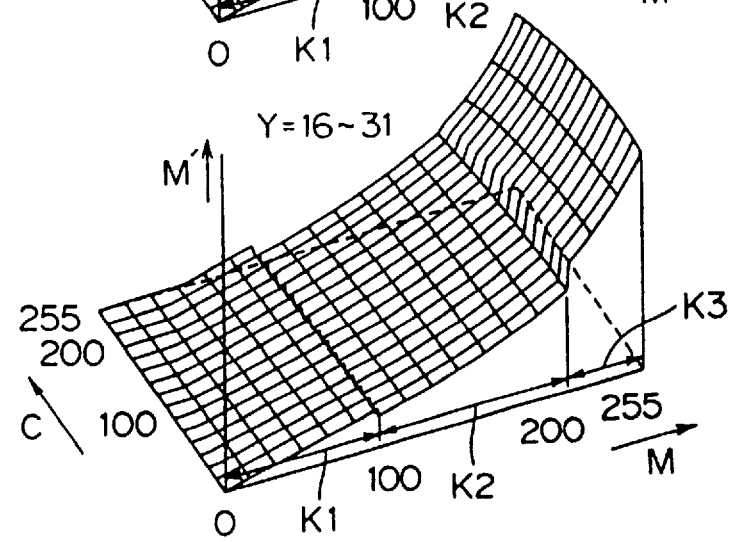
Figure 3C:
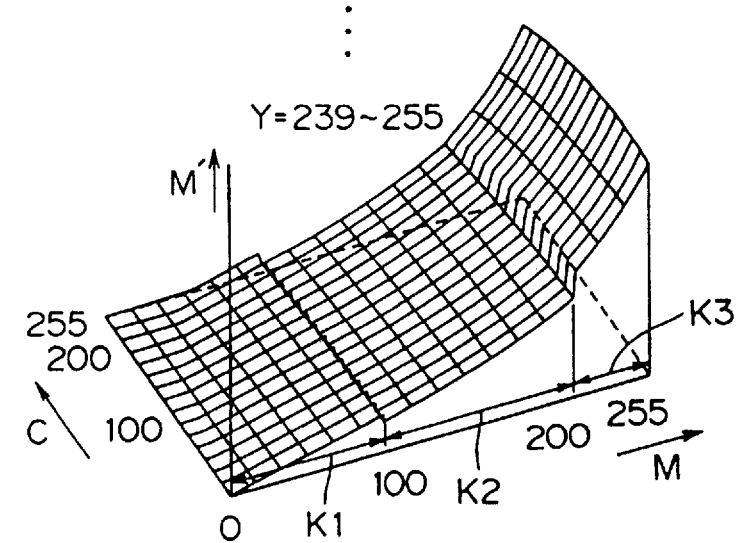

FIGS. 3 (a), (b) and (c) are diagrams for explaining masking correction in the color correcting circuit 4M. FIG. 3 (a) corresponds to a case where the data corresponding to yellow Y is in the range of 0 to 15, FIG. 3 (b) corresponds to a case where the data corresponding to yellow Y is in the range of 16 to 31, and FIG. 3 (c) corresponds to a case where the data corresponding to yellow Y is in the range of 239 to 255. Since data is prepared for each 16 gray levels with respect to yellow as described above, masking correction as shown in FIG. 3 (a) is made when Y is in the range of, for example, 0 to 15.

For example, let's pay attention to the change in the corrected data M' with the change in the data corresponding to magenta M. In this case, it is understood that the correction factor $a_{ij}$ is varied for each of the sections K1, K2 and K3 divided at the data M=100 ($=M_{th1}$) or M=200 ($=M_{th2}$). The same is true for cyan and yellow. With respect to cyan, data is prepared for each eight gray levels, as described above.

Masking correction in the color correcting circuits 4C and 4Y is the same as that in the color correcting circuit 4M.

As described in the foregoing, in the present embodiment, the gray levels of each of cyan, magenta and yellow are divided into three sections, that is, a low gray level section (0 to 100), a middle gray level section (101 to 200), and a high gray level section (201 to 255). A suitable correction factor $a_{ij}$ is set for each section. Therefore, even when the relationship between the increase or decrease in value of the data M and the increase or decrease in the density of magenta in an image formed differs with respect to a blue wavelength region and a red wavelength region, for example, it is possible to perform a good color correction processing by excluding such an effect. As a result, it is possible to reproduce colors in a document faithfully.

Meanwhile, the color correcting circuits 4C, 4M and 4Y need not be necessarily constituted by ROMs. For example, they may be constituted by volatile memories.

Figure 4:
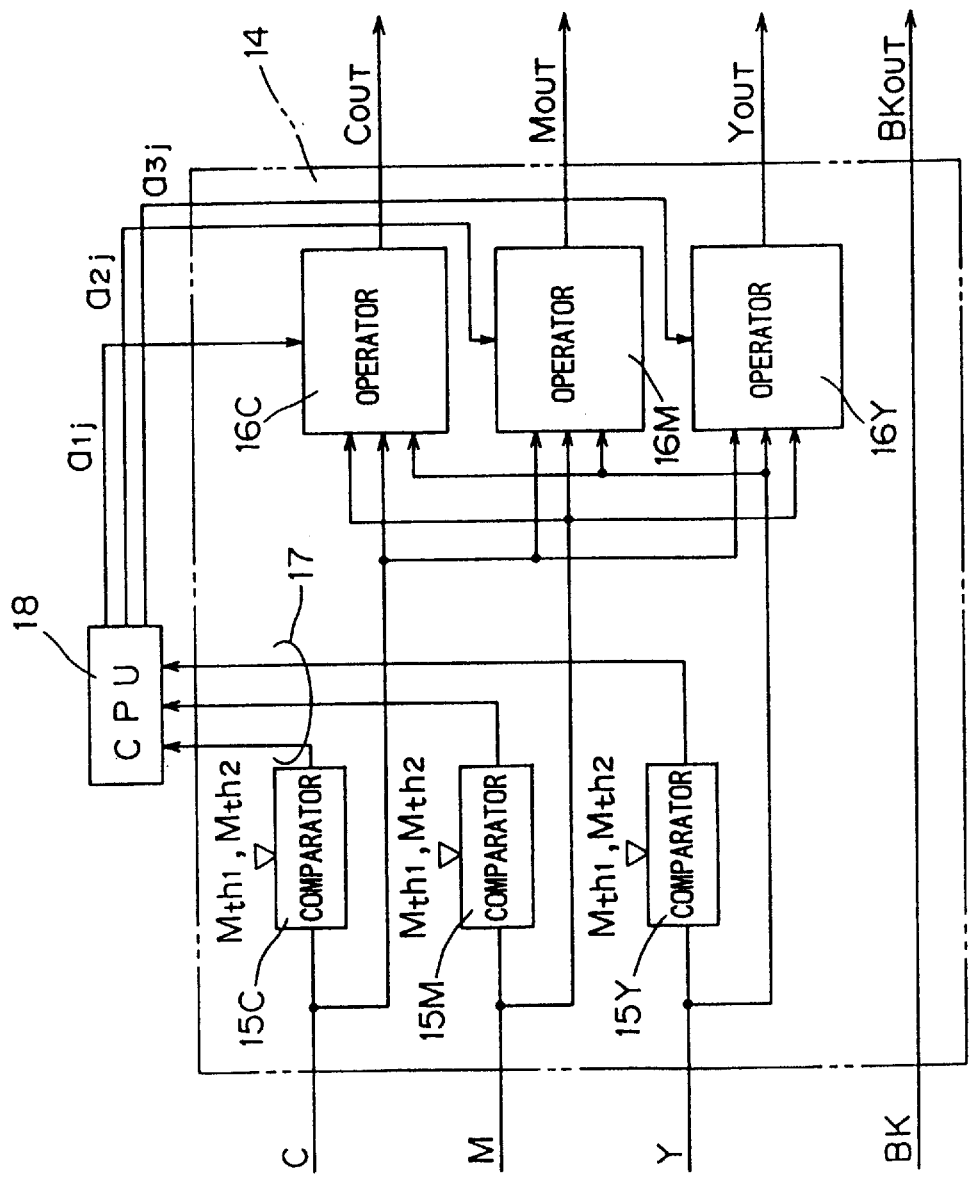
FIG. 4 is a block diagram showing the construction of a second embodiment of the present invention.

FIG. 4 is a block diagram showing the construction of a second embodiment of the present invention, which shows the structure of a color correcting section 14 used in place of the above described color correcting section 4. In this color correcting section 14, data C, M and Y from a character adaptation processing section 3 are respectively applied to comparators 15C, 15M and 15Y. The comparators 15C, 15M and 15Y respectively function as judging means. In addition, the data C, M and Y are inputted in parallel to three operators 16C, 16M and 16Y serving as masking operating means. Data BK itself shall be output data $BK_{OUT}$.

Boundary values $M_{th1}=100$ and $M_{th2}=200$ for dividing all the gray levels into three sections are applied to each of the comparators 15C, 15M and 15Y. The comparators 15C, 15M and 15Y respectively apply data indicating which sections are sections to which the values of the data C, M and Y belong through a line 17 to a CPU (Central Processing Unit) 18 functioning as, for example, correction factor setting means.

The CPU 18 applies factors $a_{11}$, $a_{12}$ and $a_{13}$ to the operator 16C in accordance with, for example, a rule shown in the foregoing table 1 on the basis of information from the comparator 15C. In addition, the CPU 18 applies factors $a_{21}$, $a_{22}$ and $a_{23}$ to the operator 16M in accordance with the rule shown in the foregoing table 1 on the basis of information from the comparator 15M. Furthermore, the CPU 18 applies factors $a_{31}$, $a_{32}$ and $a_{33}$ to the operator 16Y in accordance with the rule shown in the foregoing table 1 on the basis of information from the comparator 15Y.

FIG. 5 is a block diagram showing the structure of the operator 16M. The data C is multiplied by the factor $a_{21}$ in a multiplier 19C, and the result of the multiplication $a_{21} \cdot C$ is applied to an adder 20. In addition, the data M is multiplied by the factor $a_{22}$ in a multiplier 19M, and the result thereof $a_{22} \cdot M$ is applied to the adder 20. Furthermore, the data Y is multiplied by the factor $a_{23}$ in a multiplier 19Y, and the result thereof $a_{23} \cdot Y$ is applied to the adder 20.

In the adder 20, the respective data applied are added. As a result, corrected data M' given by the following expression (2) is obtained. This corrected data M' shall be output data $M_{OUT}$.

$$M'=a_{21} \cdot C + a_{22} \cdot M + a_{23} \cdot Y \qquad (2)$$

Masking correction is thus made in accordance with the masking equation given by the foregoing expression (A). The operators 16C and 16Y corresponding to cyan and yellow also have the same structures.

As described in the foregoing, in the present embodiment, masking correction conforming to the masking equation in which a suitable correction factor $a_{ij}$ is set for each of sections, that is, a low gray level section, a middle gray level section and a high gray level section, is achieved not using ROMs but performing operation processing based on the input data C, M and Y.

FIG. 6 is a diagram for explaining a third embodiment of the present invention, which shows the relationship between input data M corresponding to magenta and corrected data M' in a case where data C and Y are constant. In the above described first and second embodiments, the gray levels are divided at the boundary value $M=M_{th1}=100$. Accordingly, at this boundary value $M_{th1}=100$, the relationship between the increase or decrease in value of the input data M and the increase or decrease in value of the corrected data M' may, in some cases, be reversed. Specifically, a step occurs in the corrected data M', as indicated by a reference sign a1. Due to the rapid change in the corrected data M', the density of a region where the change in density should be inherently gradual may be rapidly changed in a color image formed on copy paper. Therefore, a so-called pseudo contour may be formed.

In the present embodiment, therefore, the corrected data M' in a middle gray level section K2 is corrected to the maximum value $ML_{max}$ in a low gray level section K1 when the value thereof is less than the maximum value $ML_{max}$. Consequently, correction characteristics in the vicinity of the boundary value $M_{th1}=100$ are corrected to characteristics conforming to a curve L10, thereby to prevent the rapid change in the corrected data M'.

Figure 7:
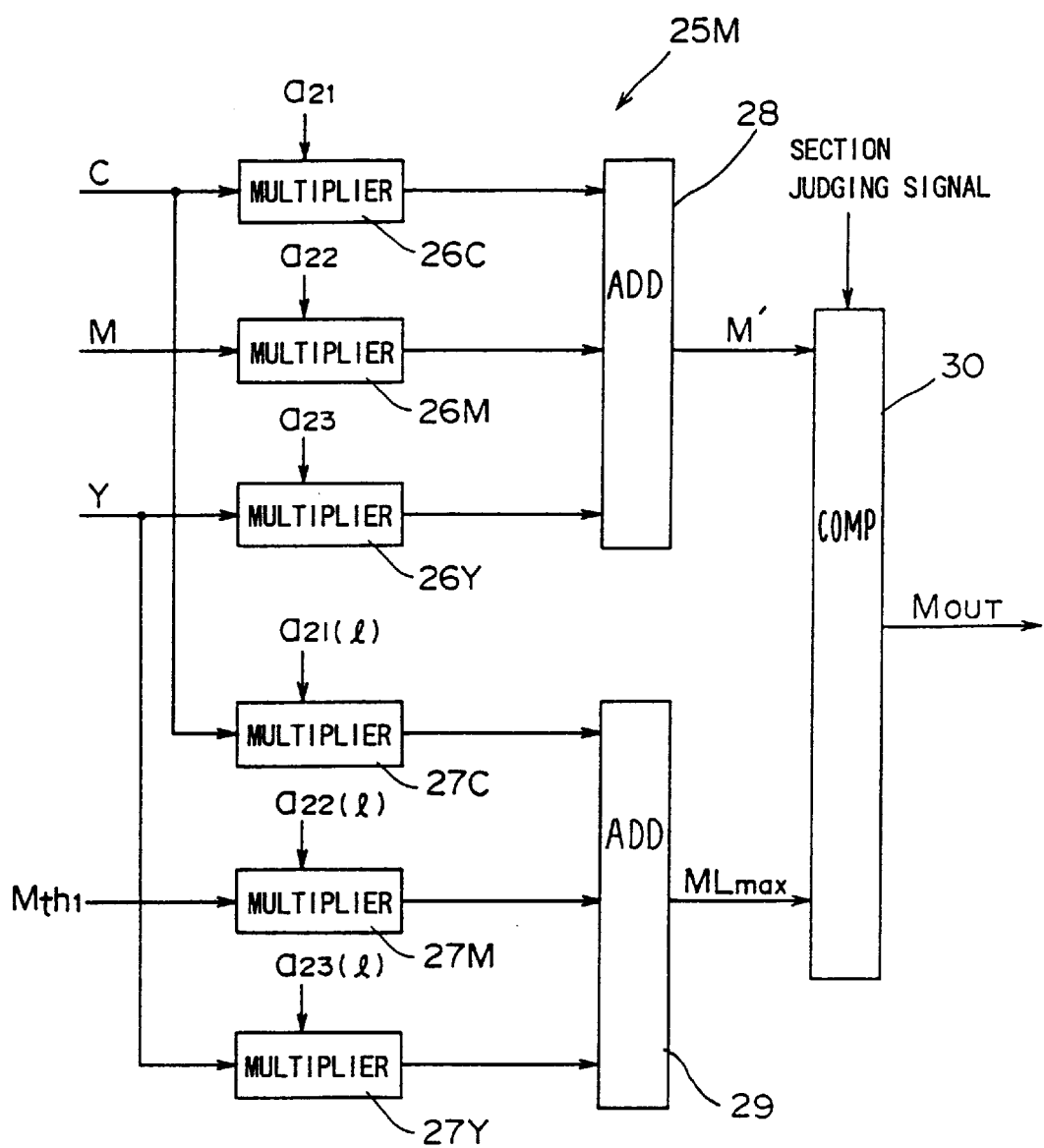
FIG. 7 is a block diagram showing the structure for realizing color correction processing in the above described third embodiment.

FIG. 7 is a block diagram showing the specific structure of an operator 25M for realizing the above described processing. The operator 25M shown in FIG. 7 should be used in place of the above described operator 16M shown in FIG. 4. This operator 25M comprises six multipliers 26C, 26M and 26Y and 27C, 27M and 27Y.

Input data C, M and Y as well as correction factors $a_{21}$, $a_{22}$ and $a_{23}$ corresponding to the value of the input data M are respectively applied to the multipliers 26C, 26M and 26Y. The multipliers 26C, 26M and 26Y respectively operate products $a_{21} \cdot C$, $a_{22} \cdot M$ and $a_{23} \cdot Y$, and apply the results of the operations to an adder 28. In addition, correction factors $a_{21}(l)$ and $a_{23}(l)$ corresponding to the low gray level section K1 are respectively applied to the multipliers 27C and 27Y. The multipliers 27C and 27Y respectively operate products $a_{21}(l) \cdot C$ and $a_{23}(l) \cdot Y$, and apply the results of the operations to an adder 29. Furthermore, a boundary value $M_{th1}$ between the low gray level section K1 and the middle gray level section K2 and a correction factor $a_{22}(l)$ corresponding to the low gray level section K1 are inputted to the multiplier 27M. The multiplier 27M operates a product $a_{22}(l) \cdot M_{th1}$, and inputs the result of the operation to the adder 29.

Each of the adders 28 and 29 adds the applied data. As a result, an output of the adder 28 becomes a value given by the following expression (3), and an output of the adder 29 becomes a value given by the following expression (4):

$$M'=a_{21} \cdot C + a_{22} \cdot M + a_{23} \cdot Y \qquad (3)$$

$$ML_{max}=a_{21}(l) \cdot C + a_{22}(l) \cdot M_{th1} + a_{23}(l) \cdot Y \qquad (4)$$

Since the output of the adder 29 is a value in a case where the input data M takes the boundary value $M_{th1}$, the output eventually corresponds to the maximum value $ML_{max}$ in the low gray level section K1. In addition, the output of the adder 28 becomes corrected data M' processed in accordance with the masking equation given by the foregoing expression (A). The multipliers 26C, 26M, 26Y, the adder 28 and the like thus constitute first operating means.

The respective results of the additions in the adders 28 and 29 are applied to a comparator 30. A section judging signal is applied to this comparator 30 from the CPU 18 (see FIG. 4). This section judging signal is a signal indicating which of the sections K1, K2 and K3 is a section to which the value of the input data M belongs. The comparator 30 refers to the section judging signal to take the corrected data M' from the adder 28 as output data $M_{OUT}$ when the input data M takes a value belonging to the section K1. When a section judging signal indicating that the input data M takes a value belonging to the middle gray level section K2 is applied, the comparator 30 selects the larger one of the output data of the adders 28 and 29 and takes the data as output data $M_{OUT}$.

The same structures are respectively prepared to correspond to cyan and yellow, and are used in place of the operators 16C and 16Y shown in FIG. 4.

By this construction, if the value of the corrected data M' obtained with respect to the value of the input data M belonging to the middle gray level section K2 is less than the maximum value $ML_{max}$ in the low gray level section K1, the maximum value $ML_{max}$ can be outputted as the output data $M_{OUT}$. Therefore, correction characteristics indicated by the curve L10 in FIG. 6 are realized. As a result, the output data $M_{OUT}$ becomes data which allows the gradual change in density in an image region where the density should be inherently gradually changed. Consequently, a pseudo contour can be prevented from being formed in an image formed on copy paper.

In the present embodiment, the multipliers 27C, 27M and 27Y, the adder 29, the comparator 30 and the like constitute second operating means.

Furthermore, the present embodiment may be changed into a structure in which the rapid change in density in the vicinity of a boundary value $M_{th2}$ between a middle gray level section K2 and a high gray level section K3 are together reduced. Specifically, when a step occurs in corrected data M' in the vicinity of the boundary value $M_{th2}$, the value of data in the high gray level section K3 may be replaced with the maximum value of the corrected data M' in the middle gray level section K2. Such processing can be performed by a structure similar to the structure shown in FIG. 7.

Figure 8:
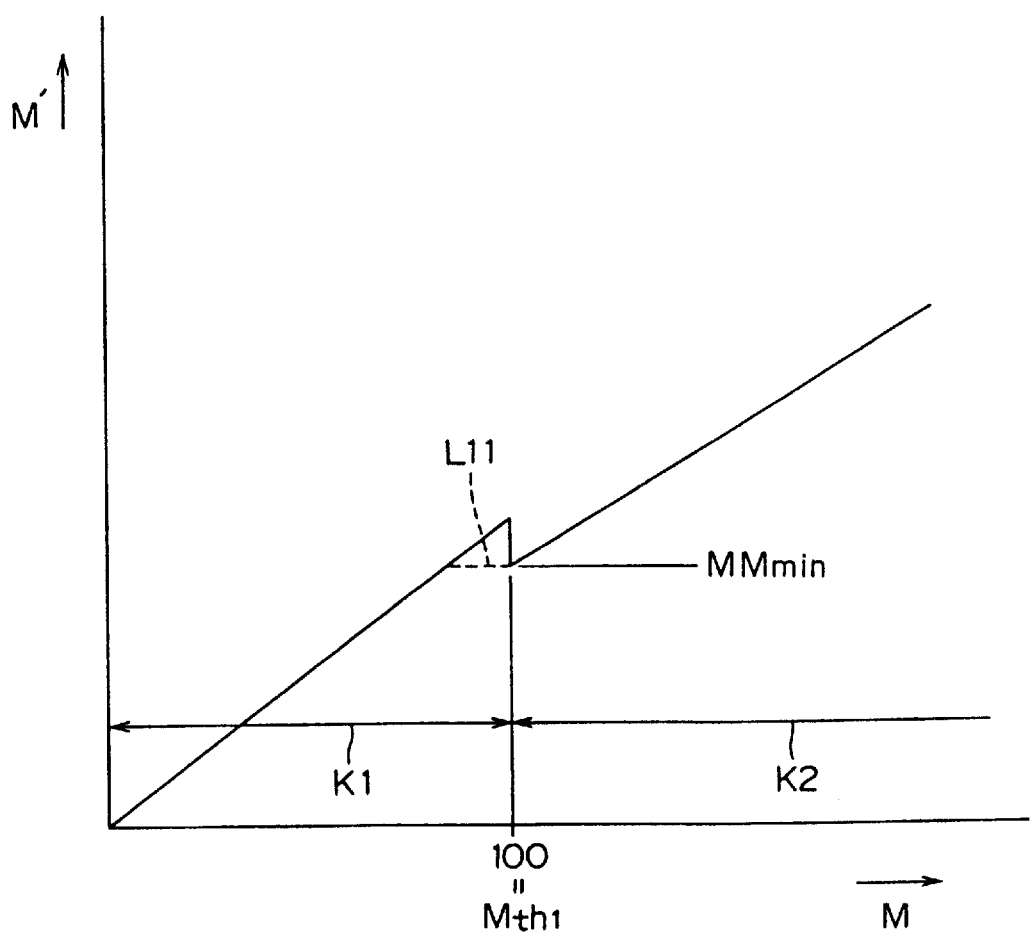
FIG. 8 is a diagram for explaining color correction processing in a fourth embodiment of the present invention.

FIG. 8 is a diagram for explaining a fourth embodiment of the present invention, which shows the change in corrected data M' in a case where input data M is changed with input data C and Y being constant. In the present embodiment, correction characteristics indicated by a curve L11 are adopted for preventing the rapid change in the corrected data M' at a boundary value $M_{th1}$=100 between a low gray level section K1 and a middle gray level section K2. Specifically, when the value of the corrected data M' in the low gray level section K1 exceeds the minimum value $MM_{min}$ in the middle gray level section K2, this corrected data M' is corrected to the minimum value $MM_{min}$.

FIG. 9 is a block diagram showing the structure of an operator 35M for realizing the above described correction characteristics. The operator 35M should be used in place of the operator 16M shown in FIG. 4. This operator 35M comprises six multipliers 36C, 36M and 36Y and 37C, 37M and 37Y.

Data C, M and Y as well as correction factors a21, a22 and a23 corresponding to the value of the data M are respectively applied to the multipliers 36C, 36M and 36Y. The multipliers 36C, 36M and 36Y respectively operate products $a_{21}$·C, $a_{22}$·M and $a_{23}$·Y, and apply the results of the operations to an adder 38. In addition, correction factors $a_{21}$(m) and $a_{23}$(m) corresponding to the middle gray level section K2 are respectively applied to the multipliers 37C and 37Y. The multipliers 37C and 37Y respectively operate products $a_{21}$(m)·C and $a_{23}$(m)·Y, and apply the results of the operations to an adder 39. Furthermore, a boundary value $M_{th1}$ between the low gray level section K1 and the middle gray level section K2 and a correction factor $a_{22}$(m) corresponding to the middle gray level section K2 are inputted to the multiplier 37M. The multiplier 37M obtains a product $a_{22}$(m)·$M_{th1}$, and inputs the result of the operation to the adder 39.

Each of the adders 38 and 39 adds the applied data. As a result, an output of the adder 38 becomes a value given by the following expression (5), and an output of the adder 39 becomes a value given by the following expression (6):

$$M' = a_{21} \cdot C + a_{22} \cdot M + a_{23} \cdot Y \quad (5)$$

$$MM_{min} = a_{21}(m) \cdot C + a_{22}(m) \cdot M_{th1} + a_{23}(m) \cdot Y \quad (6)$$

Specifically, since the output of the adder 39 is a value of the corrected data M' in the middle gray level section K2 in a case where the data M takes the boundary value $M_{th1}$, the output eventually corresponds to the above described minimum value $MM_{min}$. In addition, the output of the adder 38 becomes corrected data M' processed in accordance with the masking equation given by the foregoing expression (A). Consequently, the multipliers 36C, 36M and 36Y, the adder 38 and the like constitute first operating means.

The respective results of the additions in the adders 38 and 39 are applied to a comparator 40. A section judging signal is applied to the comparator 40 from the CPU 18 (see FIG. 4). This section judging signal is a signal indicating which of the sections K1, K2 and K3 is a section to which the value of the input data M belongs. The comparator 40 refers to the section judging signal to take the corrected data M' from the adder 38 as output data $M_{OUT}$ when the input data M takes a value belonging to the section K2. When a section judging signal indicating that the input data M takes a value belonging to the low gray level section K1 is applied, the comparator 40 selects the smaller one of the output data of the adders 38 and 39 and takes the data as output data $M_{OUT}$.

The same structures are respectively prepared to correspond to cyan and yellow, and are used in place of the operators 16C and 16Y shown in FIG. 4.

By this construction, if the value of the corrected data M' obtained with respect to the value of the input data M belonging to the low gray level section K1 exceeds the minimum value $MM_{min}$ in the middle gray level section K1, the minimum value $MM_{min}$ can be outputted as output data $M_{OUT}$. Therefore, correction characteristics indicated by the curve L11 in FIG. 8 are realized.

In the present embodiment, the multipliers 37C, 37M and 37Y, the adder 39, the comparator 40 and the like constitute second operating means.

Furthermore, the present embodiment may be changed into a structure in which the rapid change in density in the vicinity of a boundary value $M_{th2}$ between a middle gray level section K2 and a high gray level section K3 is together reduced. Specifically, when a step occurs in corrected data M' in the vicinity of the boundary value $M_{th2}$, the value of data in the middle gray level section K2 may be replaced with the minimum value of the corrected data M' in the high gray level section K3. Such processing can be performed by a structure similar to the structure shown in FIG. 9.

Figure 10:
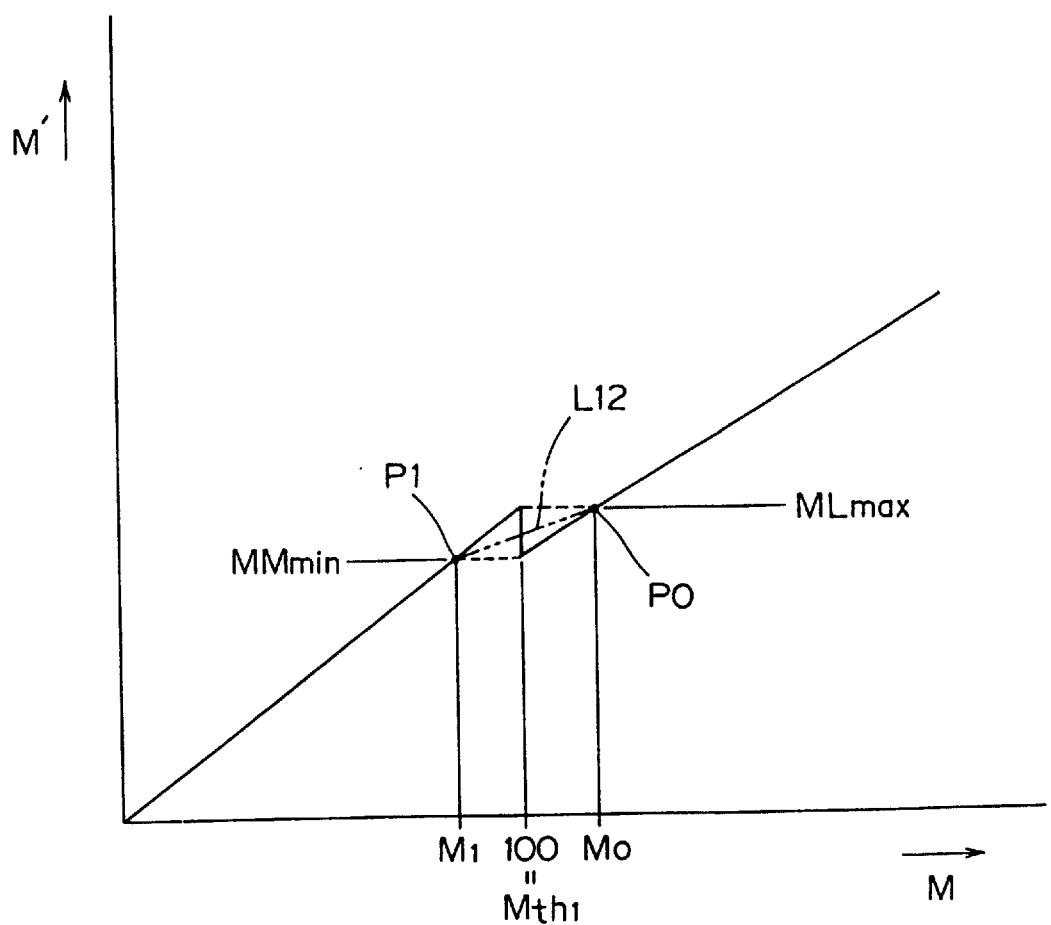
FIG. 10 is a diagram for explaining color correction processing in a fifth embodiment of the present invention.

FIG. 10 is a diagram for explaining a fifth embodiment of the present invention, which shows the change in corrected data M' in a case where input data M is changed with input data C and Y being constant. In the present embodiment, there are found a value $M_0$ of the input data M in a middle gray level section K2 at which the value of the corrected data M' equal to the maximum value $ML_{max}$ in a low gray level section K1 is obtained and a value $M_1$ of the input data M in the low gray level section K1 at which the value of the corrected data M' equal to the minimum value $MM_{min}$ in the middle gray level section K2 is obtained. The corrected data M' is so corrected that correction characteristics as indicated by a curve L12 connecting coordinate positions P0 ($M_0$, $ML_{max}$) and P1 ($M_1$, $MM_{min}$) shown in FIG. 10 are obtained.

Figure 11:
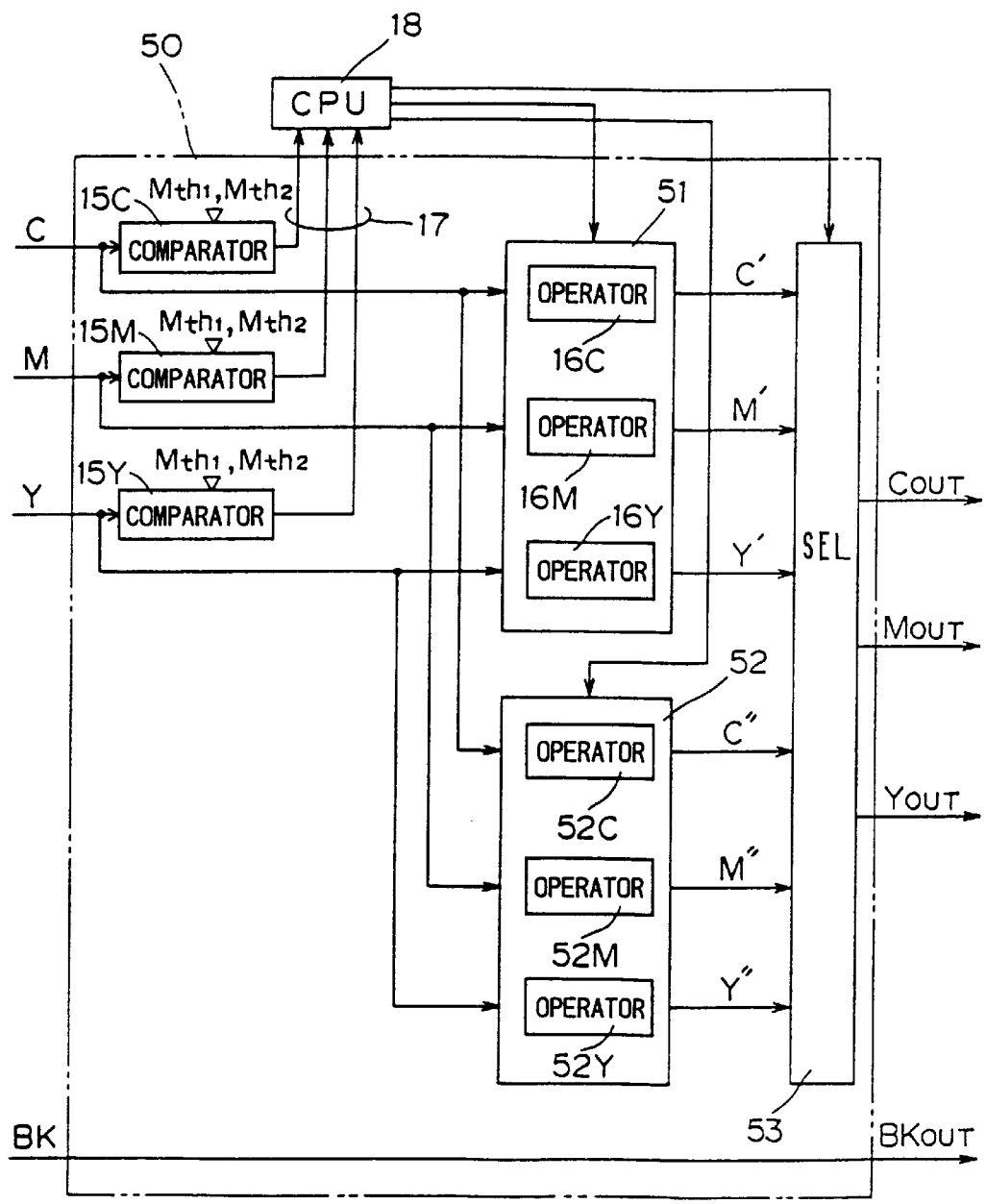
FIG. 11 is a block diagram showing the structure of a color correcting section for realizing the color correction processing in the above described fifth embodiment.

FIG. 11 is a block diagram showing the structure of a color correcting section 50 for realizing the above described correction characteristics. This color correcting section 50 should be used in place of the color correcting section 4 shown in FIG. 1. The structure shown in FIG. 11 includes in its part the same structure as the above described structure shown in FIG. 4 and hence, the same portions as those shown in FIG. 4 are assigned the same reference numerals.

In this color correcting section 50, corrected data C', M' and Y' having characteristics indicated by a solid line in FIG. 10 are outputted from a group of operators 51 serving as first operating means and are applied to a selector 53. Data from another group of operators 52 are also applied to this selector 53. The group of operators 52, the selector 53 and the like correspond to second operating means.

Input data C, M and Y are applied to the group of operators 52. The group of operators 52 has operators 52C, 52M and 52Y respectively corresponding to cyan, magenta and yellow.

Figure 12:
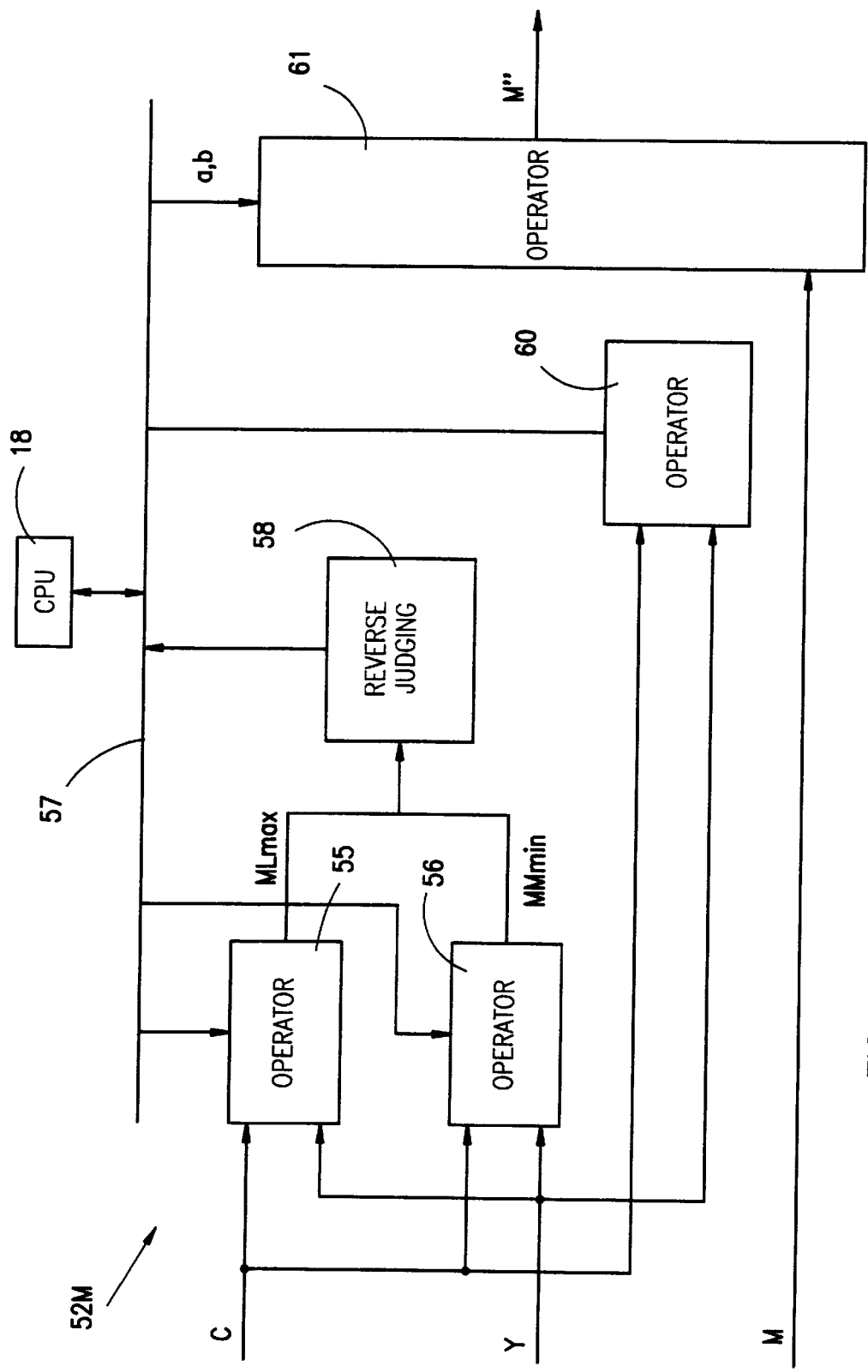
FIG. 12 is a block diagram showing the detailed structure of a part of the structure shown in FIG. 11.

FIG. 12 is a block diagram showing the structure of an operator 52M. Input data C and Y are applied in parallel to a pair of operators 55 and 56. A boundary value $M_{th1}$ between the low gray level section K1 and the middle gray level section K2 and correction factors $a_{21}(l)$, $a_{22}(l)$ and $a_{23}(l)$ in the low gray level section K1 are applied to the operator 55 through a bus 57 from a CPU 18. Consequently, in the operator 55, data given by the following expression (7) is generated:

$$ML_{max} = a_{21}(l) \cdot C + a_{22}(l) \cdot M_{th1} + a_{23}(l) \cdot Y \qquad (7)$$

Specifically, an output of the operator 55 corresponds to the maximum value $ML_{max}$ of the corrected data M' in the low gray level section K1.

On the other hand, the above described boundary value $M_{th1}$ and correction factors $a_{21}(m)$, $a_{22}(m)$ and $a_{23}(m)$ in the middle gray level section K2 are applied to the operator 56 from the CPU 18. Consequently, in the operator 56, data given by the following expression (8) is generated:

$$MM_{min} = a_{21}(m) \cdot C + a_{22}(m) \cdot M_{th1} + a_{23}(m) \cdot Y \qquad (8)$$

Specifically, an output of the operator 56 corresponds to the minimum value $MM_{min}$ of the corrected data M' in the middle gray level section K2.

The results of the operations in the operators 55 and 56 are applied to a reverse judging section 58. In the reverse judging section 58, the results of the operations are compared with each other. This reverse judging section 58 informs the CPU 18 that the corrected data M' is reversed at the boundary value $M_{th1}$ when the result of the operation in the operator 55 is larger than the result of the operation in the operator 56. The fact that the corrected data M' is reversed means that the corrected data M' does not monotonously increase as the input data M is increased in the vicinity of the boundary value $M_{th1}$.

If the reverse judging section 58 informs the CPU 18 that the corrected data M' is reversed, the CPU 18 applies to an operator 60 the correction factors $a_{21}(l)$, $a_{22}(l)$ and $a_{23}(l)$ and $a_{21}(m)$, $a_{22}(m)$ and $a_{23}(m)$ in the low gray level section K1 and the middle gray level section K2, as well as the maximum value $ML_{max}$ and the minimum value $MM_{min}$ operated in the operators 55 and 56. The data C and Y are also applied to this operator 60. On the basis of the inputted factors, values and data, the operator 60 operates to find a value $M_0$ of the input data M in the middle gray level section K2 at which the value of the corrected data M' equal to the maximum value $ML_{max}$ in the low gray level section K1 is obtained and a value $M_1$ of the input data M in the low gray level section K1 at which the value of the corrected data M' equal to the minimum value $MM_{min}$ in the middle gray level section K2 is obtained.

More specifically, the operator 60 executes operations given by the following expressions (11) and (12) on the basis of the fact that the following expressions (9) and (10) hold:

$$ML_{max} = a_{21}(m) \cdot C + a_{22}(m) \cdot M_0 + a_{23}(m) \cdot Y \qquad (9)$$

$$MM_{min} = a_{21}(l) \cdot C + a_{22}(l) \cdot M_1 + a_{23}(l) \cdot Y \qquad (10)$$

$$M_0 = \frac{ML_{max} - a_{21}(m) \cdot C - a_{23}(m) \cdot Y}{a_{22}(m)} \qquad (11)$$

$$M_1 = \frac{MM_{min} - a_{21}(l) \cdot C - a_{23}(l) \cdot Y}{a_{22}(l)} \qquad (12)$$

Such operations can be also executed by a structure which is a combination of an adder, a multiplier and a divider and can be also executed by a structure in which data is read out from a ROM in which the value $M_0$, $M_1$ is so stored as to correspond to the input data C, Y and the value $ML_{max}$, $MM_{min}$. The results of the operations $M_0$ and $M_1$ are applied to the CPU 18. In the CPU 18, a slope a and an intercept b of a straight line connecting coordinate positions P0 ($M_0$, $ML_{max}$) and P1 ($M_1$, $MM_{min}$) are operated. Since an equation representing the straight line connecting the coordinate positions P0 ($M_0$, $ML_{max}$) and P1 ($M_1$, $MM_{min}$) is given by the following expression (13), the slope a and the intercept b are respectively found by the following expressions (14) and (15):

$$M' = aM + b = \frac{ML_{max} - MM_{min}}{M_0 - M_1} \cdot M + \frac{M_0 \cdot MM_{min} - M_1 \cdot ML_{max}}{M_0 - M_1} \qquad (13)$$

$$a = \frac{ML_{max} - MM_{min}}{M_0 - M_1} \qquad (14)$$

$$b = \frac{M_0 \cdot MM_{min} - M_1 \cdot ML_{max}}{M_0 - M_1} \qquad (15)$$

The slope a and the intercept b thus found are applied to an operator 61. Input data M has been inputted to this operator 61. The operator 61 applies data M" operated in accordance with the following expression (16) to the selector 53 shown in FIG. 11:

$$M'' = a \cdot M + b \qquad (16)$$

This data M" becomes data corrected in accordance with the curve L12 shown in FIG. 10.

Operators 52C and 52Y in the group of operators 52 shown in FIG. 11 have the same structures as that of the operator 52M, and respectively output data C" and Y" corresponding to cyan and yellow. The data C" and Y" are data like the above described data M", which are data obtained by reducing steps in corrected data C' and Y' in the vicinity of the boundary between the low gray level section and the middle gray level section.

The selector 53 selects data from either one of the groups of operators 51 and 52 depending on whether or not corrected data is reversed for each of data corresponding to cyan, magenta and yellow and whether or not the data takes a value in a section corresponding to a section [$M_0$, $M_1$] and outputs the data as data $C_{OUT}$, $M_{OUT}$ or $Y_{OUT}$. For example, when corrected data M' is reversed for data corresponding to magenta M and the data M takes a value in a section corresponding to a section [$M_0$, $M_1$], data M" from the group of operators 52M is selected. In the other cases, data M' from the operator 16M in the group of operators 51 is selected. The same is true for the respective data corresponding to cyan and yellow.

In the above described manner, if the data corresponding to magenta M takes a value in the section [$M_0$, $M_1$], correction characteristics indicated by the curve L12 in FIG. 10 can be realized. Consequently, the change in the corrected data M' in the boundary between the low gray level section K1 and the middle gray level section K2 can be made gradual, thereby to make it possible to form a good image.

The same processing can be performed in a case where the corrected data M' is reversed between the middle gray level section K2 and the high gray level section K3.

FIG. 13 is a diagram for explaining a sixth embodiment of the present invention, which shows the change in corrected data M' in a case where data M is changed with data C and Y being constant. In the present embodiment, correction characteristics are so corrected as to conform to a straight line L13 in the vicinity of the boundary between a low gray level section K1 and a middle gray level section K2. This straight line L13 is a straight line connecting points P10 ($M_{th1}$−10, M'(l)) and P11 ($M_{th1}$+10, M'(m)) on a correction curve which are higher and lower than a boundary value $M_{th1}$ by ten.

Figure 14:
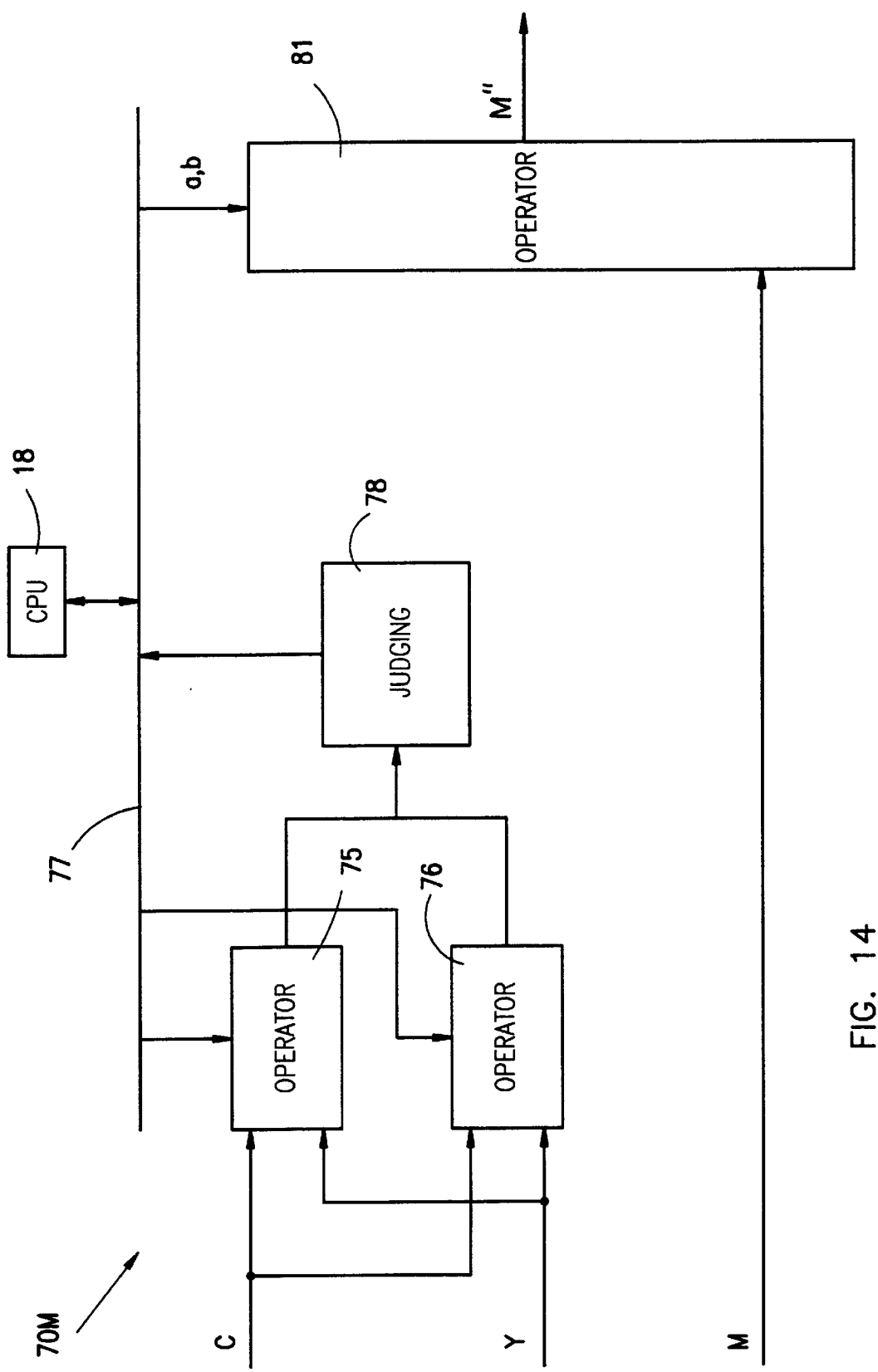
FIG. 14 is a block diagram showing the structure for realizing the color correction processing in the above described sixth embodiment.

The structure of an operator 70M for realizing such correction characteristics is shown in FIG. 14. This operator 70M should be used in place of the operator 52M shown in FIG. 11. Data C and Y are applied in parallel to a pair of operators 75 and 76. ($M_{th1}-10$) and correction factors $a_{21}(l)$, $a_{22}(l)$ and $a_{23}(l)$ in the low gray level section K1 are applied to the operator 75 through a bus 77 from a CPU 18. Consequently, data given by the following expression (17) is generated in the operator 75:

$$M'(l) = a_{21}(l) \cdot C + a_{22}(l) \cdot (M_{th1}-10) + a_{23}(l) \cdot Y \tag{17}$$

Specifically, an output of the operator 75 corresponds to a value M'(l) of the corrected data M' in a case where $M = M_{th1} - 10$.

On the other hand, ($M_{th1}+10$) and correction factors $a_{21}(m)$, $a_{22}(m)$ and $a_{23}(m)$ in the middle gray level section K2 are applied to the operator 76 from the CPU 18. Consequently, data given by the following expression (18) is generated in the operator 76:

$$M'(m) = a_{21}(m) \cdot C + a_{22}(m) \cdot (M_{th1}+10) + a_{23}(m) \cdot Y \tag{18}$$

Specifically, an output of the operator 76 corresponds to a value M'(m) of the corrected data M' in a case where $M = M_{th1} + 10$.

The results of the operations in the operators 75 and 76 are applied to a judging section 78. In the judging section 78, the results of the operations are compared with each other. This judging section 78 applies a predetermined signal allowing a correcting operation when the result of the operation in the operator 76 is larger than the result of the operation in the operator 75.

The CPU 18 to which the signal allowing a correcting operation is applied from the judging section 78 operates a slope a and an intercept b of a straight line connecting coordinate positions P10 ($M_{th1}-10$, M'(l)) and P11 ($M_{th1}+10$, M'(m)) on the basis of ($M_{th1}-10$), ($M_{th1}+10$), M'(l) and M'(m). An equation representing the straight line connecting the coordinate positions P10 ($M_{th1}-10$, M'(l)) and P11 ($M_{th1}+10$, M'(m)) is given by the following expression (19):

$$M' = aM + b = \frac{M'(1) - M'(m)}{20} \cdot M + \frac{(M_{th1} - 10) \cdot M'(m) - (M_{th1} + 10) \cdot M(1)}{20} \tag{19}$$

Consequently, the slope a is obtained by the following expression (20), and the intercept b is obtained by the following expression (21):

$$a = \frac{M'(1) - M'(m)}{20} \tag{20}$$

$$b = \frac{(M_{th1} - 10) \cdot M'(m) - (M_{th1} + 10) \cdot M(1)}{20} \tag{21}$$

The slope a and the intercept b thus found are applied to an operator 81. Data M to be corrected has been inputted to this operator 81. The operator 81 outputs data M" operated in accordance with the following expression (22), and inputs the data to the selector 53 shown in FIG. 11:

$$M'' = a \cdot M + b \tag{22}$$

This data M" becomes data corrected in accordance with the curve L13 shown in FIG. 13.

The same operators as this operator 70M are prepared with respect to cyan and yellow, and are used in place of the operators 52C and 52Y shown in FIG. 11.

The selector 53 shown in FIG. 11 selects data from either one of the groups of operators 51 and 52 depending on whether or not corrected data is reversed for each of data corresponding to cyan, magenta and yellow and whether or not the data takes a value in a section corresponding to a section [$M_{th1}-10$, $M_{th1}+10$] and outputs the data as data $C_{OUT}$, $M_{OUT}$ or $Y_{OUT}$. Specifically, if corrected data is reversed for data and the data takes a value in a section corresponding to a section [$M_{th1}-10$, $M_{th1}+10$], data from the group of operators 52 is selected. In the other cases, data from the group of operators 51 is selected.

In the above described manner, if the data corresponding to magenta M takes a value in the section [$M_{th1}-10$, $M_{th1}+10$], correction characteristics conforming to the straight line L13 shown in FIG. 13 can be realized. Consequently, the change in the corrected data M' in the boundary between the low gray level section K1 and the middle gray level section K2 can be made gradual, thereby to make it possible to form a good color image.

Figure 15:
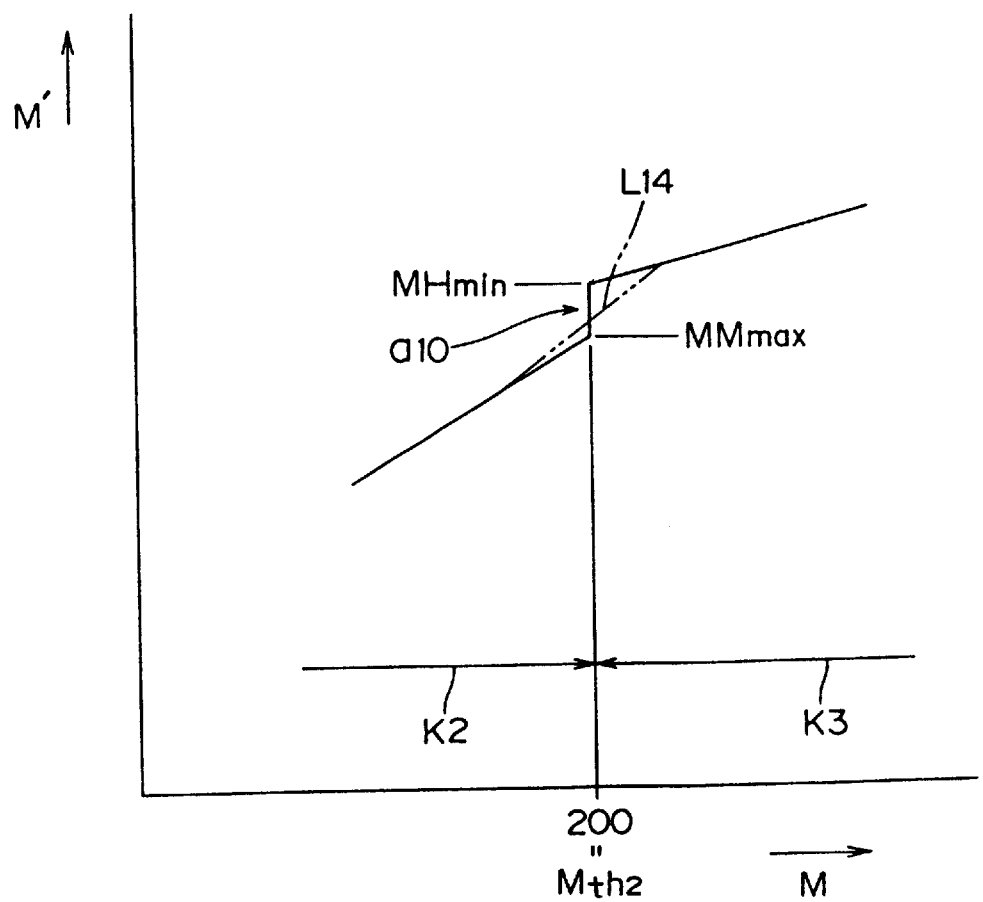
FIG. 15 is a diagram for explaining a modified example of the above described sixth embodiment.
Figure 16:
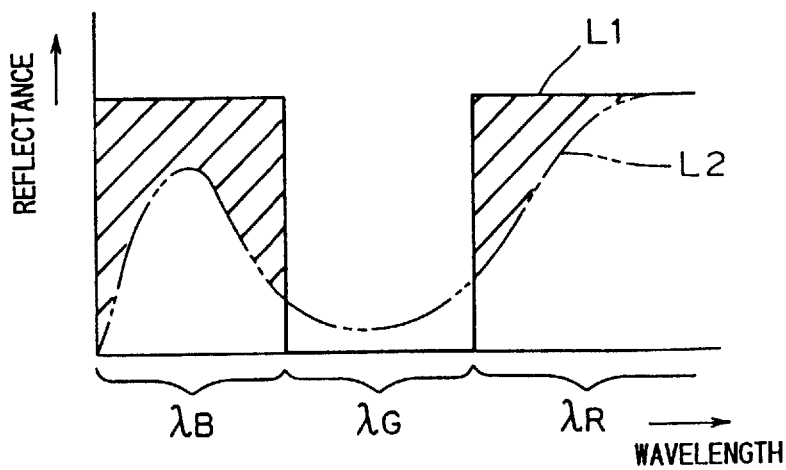
FIG. 16 is a spectrum diagram showing the light absorption characteristics of magenta toner particles.
Figure 17:
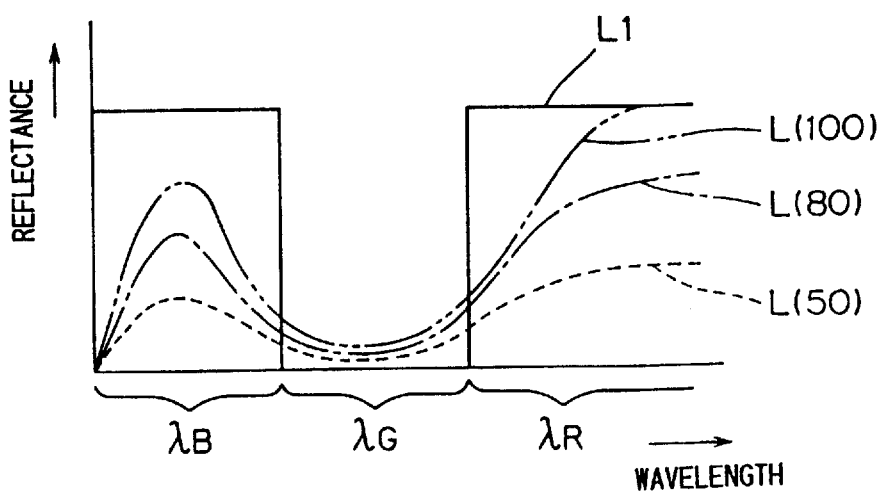
FIG. 17 is a spectrum diagram showing the change in absorption characteristics in a case where the density is changed.

The present embodiment can be used for not only reducing a step in the corrected data in the boundary between the low gray level section K1 and the middle gray level section K2 but also reducing a step in the corrected data in the boundary between the middle gray level section K2 and the high gray level section K3. Specifically, as shown in FIG. 15, even when corrected data M' is not reversed between the middle gray level section K2 and the high gray level section K3, a step a10 occurs. If correction conforming to a straight line Ll4 is made in the range of ten gray levels in the vicinity of a boundary value $M_{th2}$, therefore, it is possible to restrain the rapid change in density in a color image.

In this case, the maximum value $MM_{max}$ in the middle gray level section K2 and the minimum value $MH_{min}$ in the high gray level section K3 may be compared with each other to make correction conforming to the straight line L14 under the condition that ($MH_{min} - MM_{max}$) is, for example, not less than 10.

It goes without saying that the same processing can be performed also in a case where the corrected data M' is reversed.

Description is now made of a seventh embodiment of the present invention. The seventh embodiment will be described by referring to FIG. 2 again. In the above described third to sixth embodiments, processing for reducing a step in corrected data is performed by an operation. However, the same processing is also realized by the structure shown in FIG. 2. Specifically, data whose steps in the vicinity of the boundaries among sections K1, K2 and K3 are reduced is previously stored in a ROM. The ROM storing such data may be used as color correcting circuits 4C, 4M and 4Y. In this construction, it is possible to prevent the rapid change in the corrected data without any operation.

Although the embodiments of the present invention were described, the present invention is not limited to the above described embodiments.

For example, although in the above described embodiments, all the three primary colors are taken as particular colors, and all the gray levels of each of the three primary colors are divided into three sections, all the gray levels may be divided into two sections or not less than four sections. In addition, a correction factor $a_{ij}$ may be varied depending on which of sections is a section to which the value of input data belongs with respect to only one or two particular colors selected from the three primary colors to perform masking correction processing. Furthermore, the number of sections into which the gray levels are divided may be varied with respect to the three primary colors, or a boundary value in the case of the division may be varied with respect to the three primary colors. In order to sufficiently reproduce colors, however, it is preferable that all the gray levels are divided into not less than three sections and a correction factor is varied for each section with respect to at least cyan and magenta.

Furthermore, although in the above described third to seventh embodiments, processing for reducing steps is performed under the condition that the maximum value $ML_{max}$ in the low gray level section K1 is larger than the minimum value $MM_{min}$ in the middle gray level section K2, such conditioning is not necessarily required. In addition, processing for reducing steps may be performed under the condition that ($ML_{max}-MM_{min}$) is not less than 10 in place of the above described condition. Furthermore, such condition that $|ML_{max}-MM_{min}|$ is not less than 10 may be established.

Although in the above described embodiments, description was made of a case where the present invention is applied to a color copying machine, the present invention can be widely applied to an apparatus for forming a color image such as a color printer. In this case, a color material for forming the color image is not limited to toner particles. For example, the color material may be ink.

Furthermore, although in the above described embodiments, description was made of a case where the three primary colors (subtractive), cyan, magenta and yellow are subjected to masking correction, the present invention can be also applied to a case where the three primary colors (additive), red, green and blue are subjected to masking correction.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A color correcting method comprising:
   subjecting input data C, input data M and input data Y corresponding to three primary colors, each represented at gray levels, to correction conforming to a masking equation given by the expression $$\begin{pmatrix} C' \\ M' \\ Y' \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} C \\ M \\ Y \end{pmatrix}$$

to obtain corrected data C', corrected data M' and corrected data Y' corresponding to the three primary colors;
   dividing all gray levels of at least one selected color selected from the three primary colors into at least two sections;
   varying a correction factor $a_{ij}$ (where i=1, 2, 3, and j=1, 2, 3) in the masking equation based upon which section the input data of the selected color belong; and
   performing correction processing for further correcting corrected data corresponding to said selected color when said corrected data of said selected color has a value near a boundary between said sections, said correction processing providing further corrected data which gradually changes as the input data corresponding to said selected color change.

2. A color correcting method according to claim 1 wherein in said correction processing, said further corrected data are so corrected as to monotonously increase as the input data corresponding to said selected color increase.

3. A color correcting method according to claim 1, wherein
   said color correcting method is applied to a color image forming apparatus for forming a color image using color materials of the three primary colors, and
   the correction factor $a_{ij}$ in said masking equation is determined on the basis of characteristics of said color materials of the three primary colors.

4. A color correcting device having correcting means for subjecting input data C, input data M and input data Y corresponding to three primary colors, each represented at gray levels, to correction conforming to a masking equation given by the expression $$\begin{pmatrix} C' \\ M' \\ Y' \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} C \\ M \\ Y \end{pmatrix}$$

for obtaining corrected data C', corrected data M' and corrected data Y' corresponding to the three primary colors, wherein
   said correcting means comprises
   first operating means for obtaining the corrected data C', the corrected data M' and the corrected data Y', said first operating means varying a correction factor $a_{ij}$ (where i=1, 2, 3, and j=1, 2, 3) in the masking equation based upon which one of at least two sections into which all gray levels of at least one selected color selected from three primary colors are divided, said one section being the section to which the input data of the selected color belong, and
   second operating means for further correcting the corrected data of the selected color when the input data of the selected color have a value near a boundary between said sections, said second operating means further correcting the corrected data from said first operating means to provide further corrected data that gradually change as the input data corresponding to the selected color change.

5. A color correcting device according to claim 4, wherein said first operating means comprises
   judging means for judging which section the value of the input data corresponding to the selected color belongs,
   correction factor setting means for setting the correction factor $a_{ij}$ in the masking equation on the basis of result of a judgment by said judging means, and
   masking operating means for executing an operation conforming to the masking equation on the basis of the correction factor $a_{ij}$ set by said correction factor setting means.

6. A color correcting device according to claim 4, wherein said first operating means and said second operating means comprise storing means for storing the corrected data C', the corrected data M' and the corrected data Y' obtained by varying the correction factor $a_{ij}$ in the masking equation for each of the at least two sections so as to have a correspondence with the input data C, the input data M and the input data Y, and for storing data obtained by further correcting said corrected data so as to have a correspondence with the input data of the selected color when the input data of the selected color has a value near the boundary between said sections.

7. A color correcting device according to claim 4, wherein said second operating means further corrects the corrected data obtained by said first operating means whereby the further corrected data monotonously increase as the input data of the selected color increase.

8. A color correcting device according to claim 4, wherein said color correcting device is applied to a color image forming apparatus for forming a color image using color materials of the three primary colors, and the correction factor $a_{ij}$ in said masking equation is determined on the basis of characteristics of said color materials of the three primary colors.

* * * * *